Figure 1:
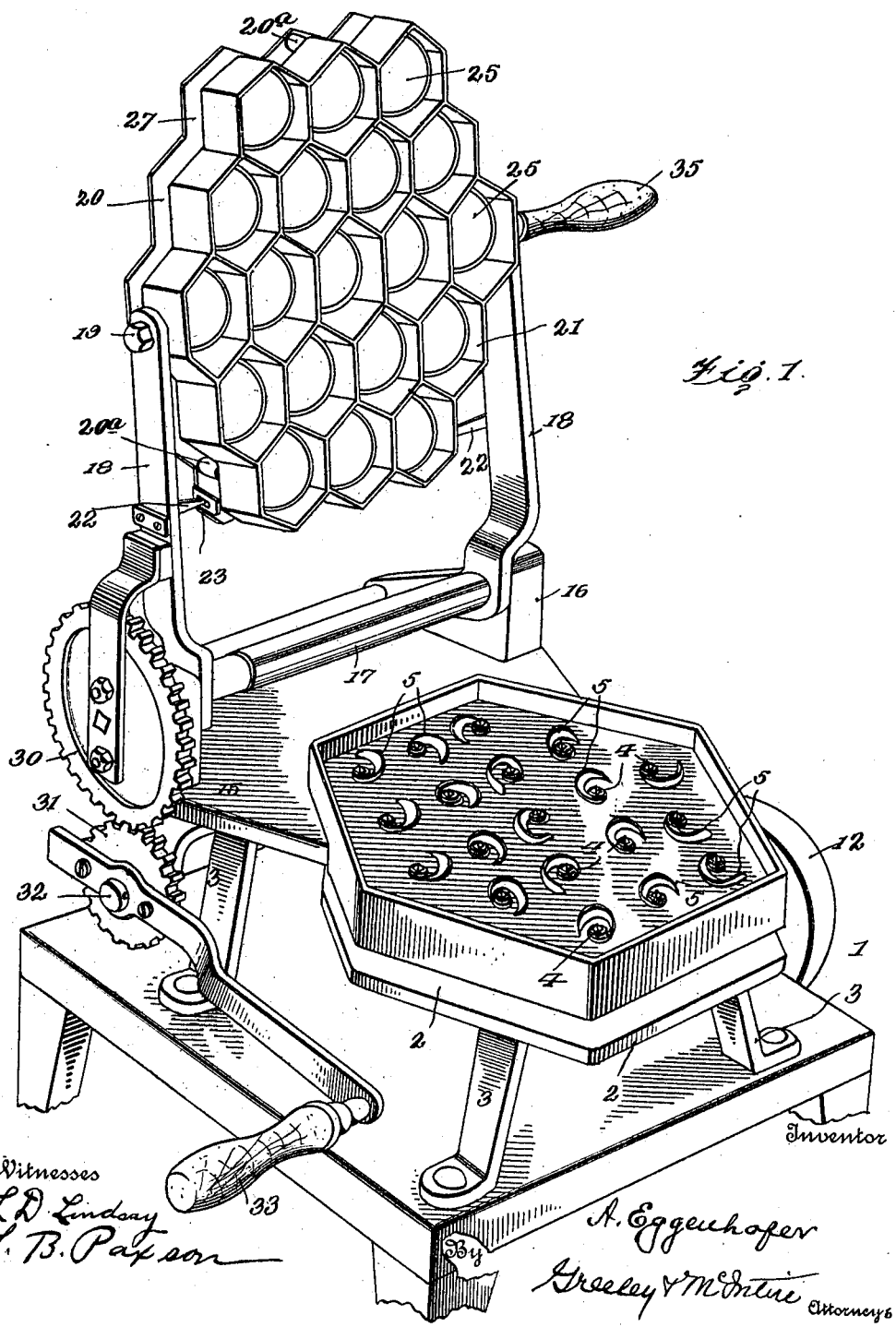

A. EGGENHOFER.
DOUGH DIVIDING AND ROUNDING MACHINE.
APPLICATION FILED AUG. 19, 1910.

978,440.

Patented Dec. 13, 1910.
3 SHEETS—SHEET 1.

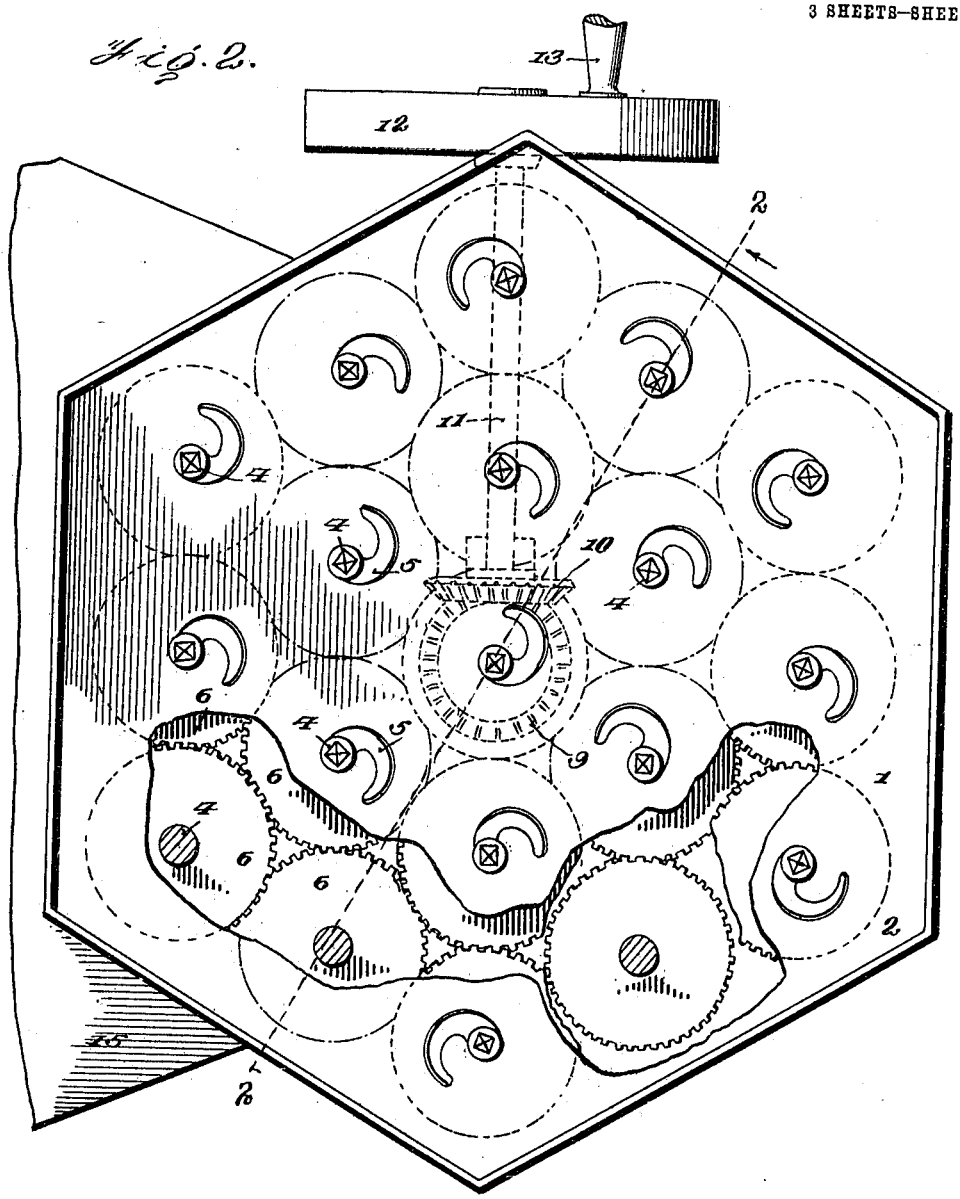

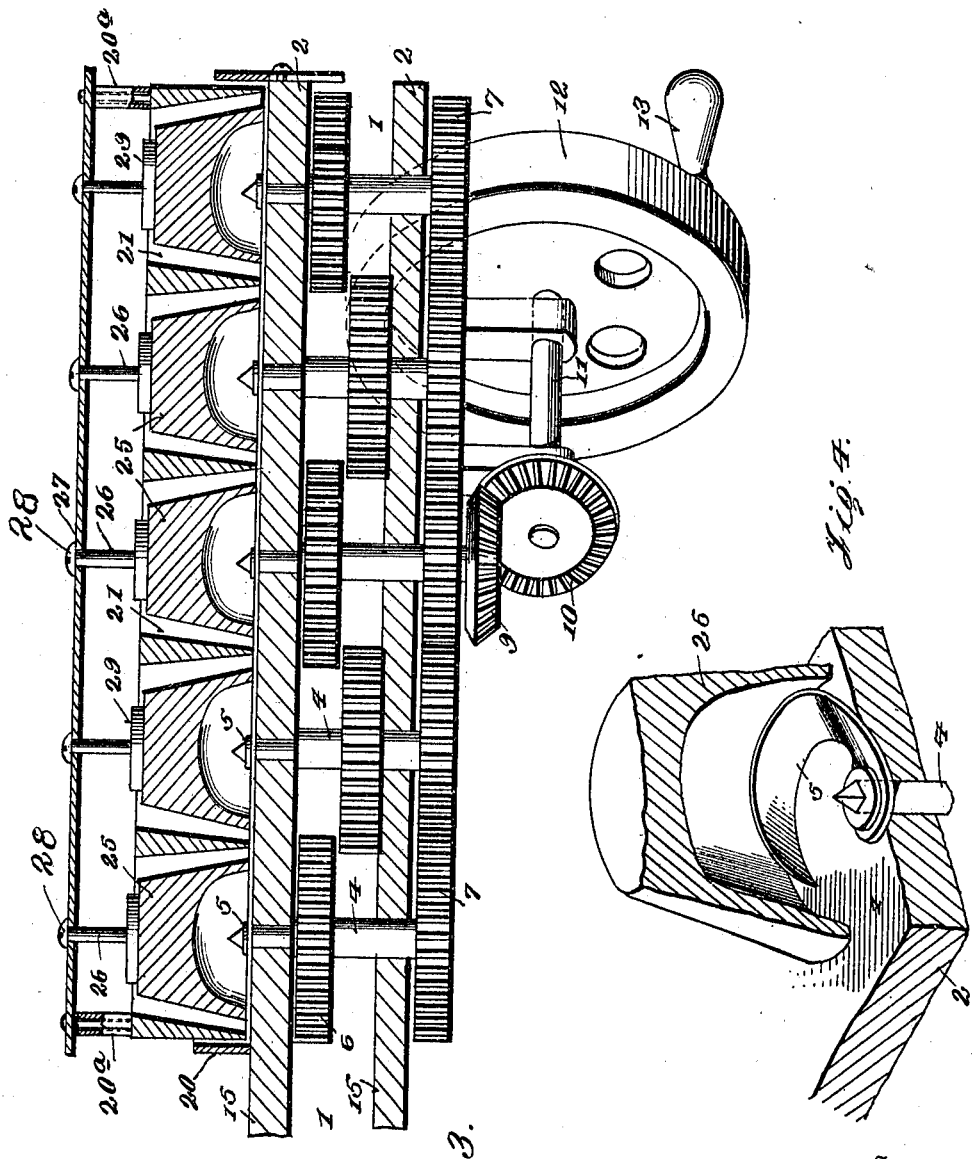

UNITED STATES PATENT OFFICE.

AUGUST EGGENHOFER, OF ZANESVILLE, OHIO.

DOUGH DIVIDING AND ROUNDING MACHINE.

978,440.  Specification of Letters Patent.  Patented Dec. 13, 1910.

Application filed August 19, 1910. Serial No. 577,936.

*To all whom it may concern:*

Be it known that I, AUGUST EGGENHOFER, a citizen of the United States, residing at Zanesville, in the county of Muskingum and State of Ohio, have invented certain new and useful Improvements in Dough Dividing and Rounding Machines; and I do hereby declare the following to a full, clear, and exact description of the invention, such as will enable others skilled in the art to which it appertains to make and use the same.

This invention relates to improvements in an apparatus for making rolls, buns or the like.

The prime object of the invention is to provide means for forming from a mass of dough, a plurality of appropriately shaped rolls or buns.

The invention also comprehends improvements in the means employed for cutting the dough, and simultaneously imparting to it a centrifugal action, whereby to pack and shape it in the various molds.

The invention also relates to improvements in the specific details of construction and arrangement of parts to be hereinafter described and particularly pointed out in the claims.

In the drawings—Figure 1 is a perspective view of my improved apparatus, the parts being open to receive a mass of dough. Fig. 2 is a top plan view of the dough receiver, parts being broken away to illustrate the gearing. Fig. 3 is a section approximately on the line $x$—$x$, Fig. 2, the frame however being shown in closed position. Figure 4 is a detail perspective view of one of the molds and a cutter which coöperates therewith.

1 indicates a base, composed of two spaced apart plates 2—2, supported on legs 3. Mounted in bearings formed in the two plates 2—2 are vertically disposed shafts 4, each having on its upper end, and operating close to the surface of the upper plate 2, a combined cutter and packer 5. Each vertical shaft 4, is further provided with two gear wheels 6 and 7, the gears 6 being located in the space formed between the plates 2—2, and the gears 7 below the lowermost plate 2, as clearly shown in Fig. 3. The gears are arranged to intermesh to impart to the vertical shafts the necessary revoluble movement.

The middle shaft 4, is provided on its lower end with a beveled pinion 9, which meshes with a beveled pinion 10, mounted on a horizontal shaft 11, supported in bearings depending from the lower plate 2. On the outer end of the shaft 11, is a crank wheel 12, having a handle 13, by means of which motion is imparted to the train of gears. Obviously by rotating the shaft 11, the shafts 4, will be revolved, which will, by reason of the disposition of the gears 6, cause each alternate cutter and packer to revolve in the opposite direction. Each combined cutter and packer is of spiral formation its outer free end being pointed and bent up at an angle to engage under the dough so as to force it up into the cells or molds.

Extending from the base 1, is a bracket 15, which has bearings 16 for a horizontal shaft 17, rigidly secured to which are two arms 18. Supported in the outer ends of the arms on studs 19, is a frame 20, comprising a plurality of hexagon or other shaped cells 21, which correspond to the disposition of the various cutters and packers. There is one cell for each cutter, the latter coöperating with the former to perform the function of this invention. The frame is permitted to have a slight rocking movement in the arms 18. Two short yielding arms 22, project from the arms 18, and fit in sockets 23, in the frame and serve to hold the frame in its proper relative position but to move slightly when the mass of dough is unevenly disposed on the upper surface of the base, as will be presently described.

Fitting in each cell is a cup shape plunger 25, hollow on its under surface and centrally disposed over a cutter when the frame 20, is thrown down on the base. A post 26, extends up from each cup shape plunger, and it passes through a supporting plate 27, normally spaced from the frame 20, by sleeves 20ª, to permit the cups to have movement independent of the frame when the apparatus is in operation. The posts are provided with heads 28, to limit the movement of the cups in one direction, and they are also provided with weights 29, to balance them when the cutters are operated.

Secured on the outer end of the shaft 17, is a gear wheel 30, which meshes with a gear wheel 31, on a stub shaft 32, extending from a bracket on the support 15. A handle 33, is secured to the gear wheel 31, for convenience in revolving the gears to elevate the frame and its plurality of cells, to the position shown in Fig. 1.

In operation, a mass of dough is placed on the upper surface of the base 1, and by turning the handle 33, the frame 20, and the plurality of cells are lowered onto the base, as shown in Fig. 3. The slots in which the yielding arms 22, fit permitting the cells assuming their proper relative position with reference to the respective cutters. The cells having been lowered, the operator holds them down by the handle 35, and turns the crank wheel 12, which causes the packers to be rapidly revolved under the respective cells. This action severs the dough from the mass, and the centrifugal action imparts a corresponding movement to the dough and packs it in the cells, the latter also being revolved, and held in position on its respective piece of dough by the balancing weights. As the packers revolve and pack the dough in the cells, the air is forced out to make room for the dough subsequently packed therein. The bent up spiral ends of the cutters, when the latter are revolved, tend to force the dough upwardly in the respective cells, so that the buns or rolls will be formed.

By employing an apparatus such as described, it will be evident a number of buns can be made in a single operation, and that they will each be of uniform size and weight.

Having thus described my invention what I claim is:—

1. An apparatus of the class described, comprising a base, a plurality of revolving spiral packers mounted on the base, a plurality of cells coöperating with the packers, and means for raising and lowering the plurality of cells toward and from the spiral packers.

2. An apparatus of the class described, comprising a base, a plurality of shafts mounted in the base, a combined spiral cutter and packer on each shaft, gears for revolving the shafts, a tilting frame, means for tilting the frame, a series of cells supported in the frame, there being one cell for each combined cutter and packer, and means for permitting movement of the cells.

3. An apparatus of the class described, comprising a base, a plurality of spiral packers mounted on the base, each packer having a portion at or near its free end bent upwardly at an angle, a frame, a plurality of cells mounted in the frame, there being a cell for each packer, means permitting vertical movement of the upper portion of each cell, and means for raising and lowering the frame.

4. An apparatus of the class described, comprising a base, a plurality of revolving packers mounted in the base, a pair of arms, a frame mounted in the arms and having a plurality of cells, a movable weighted cap for each cell, and means for permitting slight rise of the cells independent of the movement of the weighted caps.

5. An apparatus of the class described, comprising a base, a series of spirally formed packers mounted on the base, means for individually revolving the packers, a tilting frame, adapted to be moved toward and from the base, gears for tilting the frame, said frame having a plurality of cells, a plate supported over the frame, a series of cup shape caps loosely supported by the plate and fitting in the cells, and means for permitting a slight movement of the frame independent of the movement of the cup shaped caps.

6. An apparatus of the class described, comprising a base, a series of spiral packers mounted on the base, means for revolving the spiral packers, a frame fitting over the base, a series of cells formed in the frame, the top of each cell having a vertically movable cup shape cap, and means for permitting slight movement of the frame independent of the movement of the cup shape caps.

7. An apparatus of the class described comprising a base, a series of revolving packers mounted on the base, a frame having a series of cells, cup shape caps mounted in each cell, means for permitting vertical and rotary movement of the cup shape caps when the packers are revolved to pack dough in the cells.

In testimony whereof I affix my signature in presence of two witnesses.

AUGUST EGGENHOFER.

Witnesses:
  W. B. COSGROVE,
  H. F. ACHAUER.